United States Patent [19]
Johnston

[11] 4,040,118
[45] Aug. 2, 1977

[54] PRESSURE SENSITIVE TRANSDUCER

[75] Inventor: Samuel Andrew Johnston, Fontana, Wis.

[73] Assignee: Bunker Ramo Corporation, Oak Brook, Ill.

[21] Appl. No.: 587,807

[22] Filed: June 18, 1975

[51] Int. Cl.² .............................................. H01G 7/00
[52] U.S. Cl. .................................. 361/283; 73/398 C
[58] Field of Search ....................... 73/398 C; 317/246

[56] References Cited
U.S. PATENT DOCUMENTS 3,808,480  4/1974  Johnston .......................... 317/246 X Primary Examiner—E. A. Goldberg
Attorney, Agent, or Firm—F. M. Arbuckle; R. Muehleman

[57] ABSTRACT

The following specification is directed to a pressure responsive transducer utilizing dual diaphragms on opposite sides of a sandwich of substrates formed of ceramic and having an intermediate substrate in which a slot is formed to communicate with the diaphragm chamber and eliminate the need for puncturing and/or sealing of one of the diaphragms. External electrical connections to fixed capacitor plates deposited on the outer substrates of the sandwich are extended by forming a lead on the intermediate substrate which connects to the fixed plates through aligned openings in the substrates, that also communicate the chambers formed by the diaphragms.

16 Claims, 2 Drawing Figures

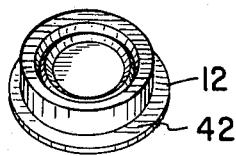
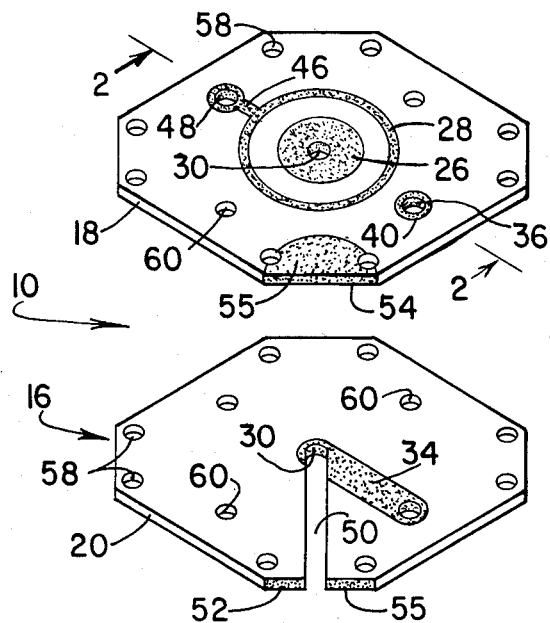
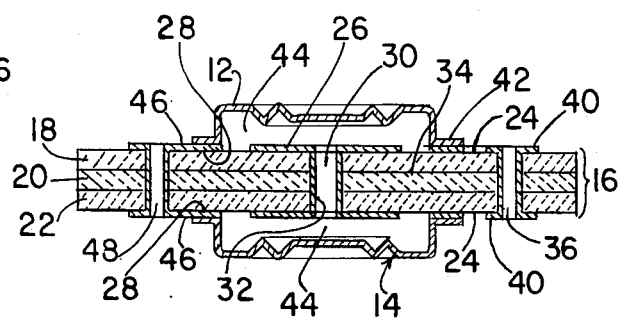
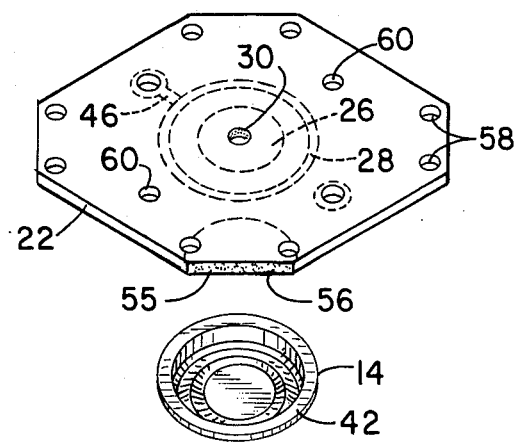

PRESSURE SENSITIVE TRANSDUCER

FIELD OF THE INVENTION

This invention relates in general to pressure responsive transducers and, more particularly, to an improved and more economical capacitative diaphragm type pressure transducer.

SUMMARY OF THE PRIOR ART

In U.S. Pat. No. 3,808,480 there is disclosed an improved pressure transducer utilized to obtain electrical signals corresponding to pressure variations existing between variably sized chambers formed by a pair of diaphragms and either a chamber surrounding the diaphragms or the ambient environment. The transducer is an unusually compact and effective arrangement for detecting pressure variations and the two diaphragms forming the variable chambers are each soldered or otherwise hermetically secured to a respective electrode on a nonconductive substrate.

The electrode encircles and is spaced from a respective inner electrode or fixed capacitor plate located on the nonconductive substrate and an opening in the substrate communicates the chambers formed by the diaphragms on opposite side of the substrate to equalize the pressure therebetween. The diaphragms thus also form one plate of a capacitor and their spacing from the fixed plates on the substrate is determined by the difference in pressure between the variable chambers and the external space, which pressure difference is signalled by extending respective leads from the diaphragm electrodes and the fixed capacitor plates.

In the described arrangement, at least one of the diaphragms was pierced, usually along its central axis for forming a vacuum between the diaphragms. The hole in the pierced diaphragm was then required to be soldered or sealed in a vacuum chamber or alternatively a connection to an external vacuum or source of pressure has to be provided by a fitting usually connected at the rim wall of the diaphragm.

A problem is therefore created not only by the economics and reliability of the process, but also by the response of the diaphragm due to the distortions introduced by the opening and the seal in the diaphragm and by the differences in the reaction of one diaphragm from the other.

Alternatively, the space between the diaphragms may be at ambient pressure and the entire transducer in turn placed in a containment chamber, which is either subject to a vacuum or some other pressure source, but this undesirably requires an additional chamber.

Another problem relates to the need for extending a lead from the fixed capacitor plates since this lead usually passes between a diaphragm rim and the adjacent substrate and must be insulated from the diaphragm thereby creating an undesirable capacitative relationship.

BRIEF SUMMARY OF THE INVENTION

This invention provides a diaphragm type pressure transducer in which communication and/or sealing of the variably sized chamber formed by each diaphragm is provided without affecting the response of either diaphragm.

Basically this is accomplished by a sandwich or substrate assembly including an intermediate substrate having a radially extending slot therein to form a conduit or passageway through which communication with the variable chambers formed by the diaphragms is easily established at the boundary or edge of the substrate and leaves the diaphragms unstrained and in similar condition. When the intermediate substrate is placed between two opposing or spaced substrates, each carrying a respective diaphragm and fixed capacitor plate, the conduit is closed except at the end or edge of the intermediate substrate and a metal layer or deposit on portions of each substrate adjacent the boundary end of the slot may be soldered to either close the end of the passageway or to enable an appropriate fitting to be secured thereto as desired without introducing any strain or undesired condition in the diaphragms.

Electrical connections to and between the diaphragms are established by conductive deposits or leads formed on supporting surfaces of the outer substrates and on aligned passageways extending through all the substrates. The fixed capacitor plates are connected to an external connection by a lead extending through the passageway between the diaphragm chambers to thereby use this passageway for two purposes and connected to a lead on the intermediate substrate extending to a position external to the diaphragm peripheries to thereby space the fixed plate leads from the diaphragms and their leads by a uniformly large distance and to minimize distortions in capacitative response.

BRIEF DESCRIPTION OF THE DRAWINGS

FIG. 1 is an exploded isometric view of the pressure transducer embodying the principals of the present invention; and FIG. 2 is a a sectional view taken generally through the line 2—3 in FIG. 1.

DESCRIPTION OF THE PREFERRED EMBODIMENT

In FIG. 1, an assembly forming a capacitative pressure transducer is indicated by the reference character 10. The transducer 10, as described in the aforementioned patent may be referred to as a capsule and be secured in a casing or exposed to an ambient environment condition as required by its use. The transducer 10 includes a pair of spaced cup shaped metallic diaphragms 12 and 14 with a substrate assembly 16 therebetween.

The substrate assembly 16 includes an upper plate or outer substrate 18 and intermediate plate or substrate 20 and a lower plate or outer substrate 22. The substrates 18, 20 and 22 are each preferably formed of a ceramic material such as 94% $Al_2O_3$ sold by American Lava Corporation, a subsidiary of 3M Company and located at Chattanooga, Tennessee. The substrate material is described in advertising literature entitled AlSiMg and in a publication entitled Design Consideration for Multilayer Ceramic Substrates, both published by the aforementioned Company.

The substrates 18, 20 and 22 are shaped in the form of polygons such as hexagons, rectangles or squares with sheared corners having coincident edges or boundaries when stacked. Each outer substrate 18 and 22 is between 0.010 inch and 0.030 inch thick, preferably between 0.020 inch and 0.030 inch thick, and has printed or otherwise hermetically sealed and secured on the outer or supporting surface 24 thereof metallized portions comprising or forming an inner or fixed capacitor plate 26 and an outer annular electrode or lead 28 spaced from and encircling the fixed plate 26. An aligned hole or passageway 30 in each fixed plate 26 and each substrate 18, 20 and 22 extending along the central axis of each substrate 18, 20 and 22 has a conductive material or lead 32 deposited and bonded on the walls thereof as seen in FIG. 2. The lead 32 interconnects each fixed capacitor plate 26 with a conductive deposit or lead 34 formed and secured on one surface of the plate 20, separated from lead 28 by the thickness of substrate 18, and extending to a second series of aligned or registering so-called via holes or passageways 36 radially outwardly of or beyond the periphery of the diaphragms 12 and 14. The holes 36 each have a suitable metal deposit or lead on the walls thereof interconnecting the fixed capacitor plates 26 with the terminals 40 on the supporting surfaces 24 of substrates 18 and 22 at a position beyond the periphery of the diaphragms 12 and 14.

Each cup shaped diaphragm 12 and 14 has a peripheral rim or wall portion 42 which is soldered or otherwise hermetically secured or bonded to a respective annular electrode 28 so that each diaphragm is hermetically secured to a respective supporting surface 24 to form a respective chamber 44 which communicates through the passageways 30 to equalize pressure in the chamber. A metal deposit or lead 46 bonded on the outer supporting surface 24 of each outer substrate 18 and 22 extends radially outwardly from the electrode 28 to a terminal on each supporting surface and these are connected in common by metal deposited lead bonded to the wall of so-called via holes or passageway 48 in each substrate to enable the diaphragms to be connected in common to an external lead.

The intermediate substrate or plate 20 is substantially 0.030 inch thick and has a radially extending passageway or slot 50 formed therein and extending radially outwardly from the passageway 30 to one edge portion or boundary 52 of plate 20. The edge portion 52, which is radially outward of the periphery of diaphragms 12 and 14 has a suitable metal deposit 55 formed and bonded thereon as to adjacent edge or boundary portions 54 and 56 and adjacent supporting surfaces 24 of substrates 18 and 22. The respective edge or boundary portions of substrates 18 and 22 are coincident with edge portion 52 and adjacent the radial outward end of slot 50. Thus when the plates are stacked and and fired to provide a bond and a hermetic seal therebetween, the slot 50 and adjacent substrates, which overlap the slot 50, form a fluid passageway, port or orifice which communicates with the central passageways 30 and the hermetically sealed variable sized chamber formed by the diaphragms and the substrates. The fluid passageway may be used to establish a vacuum in chambers 44 and then sealed by applying solder, for example, to the adjacent metallized portions 52 and 54 and 56 of the substrates or a conduit fitting may be secured thereto thereby eliminating problems created by an opening in one of the diaphragms. The metallized portions 52, 54 and 56 on the boundary or periphery of the substrate assembly and on supporting surface 24, thus enable control of the fluid passage through the passageway 50.

The lead 34 extends radially outwardly at 180° from lead 46 and is, of course, uniformly spaced by a relatively large distance from the diaphragms and lead 46 to minimize capacitative problems. If required, the conduit or slot 50 may be provided with a metal deposit to facilitate a connection to the fixed capacitor plate instead of utilizing lead 34.

The substrates 18, 20 and 22 are provided with suitable spaced and aligned openings 58 for mounting purposes and a pair of passageways 60 are provided in the plates to provide fluid communication between opposite supporting surfaces and external diaphragm surfaces in the event the transducer is mounted in a container or in a vessel without means for equalizing the external pressure on the diaphragms.

Preferably, in forming the transducer 10, the ceramic substrates 18, 20 and 22 are first formed and punched to form the passageways or openings and metallized in the described configurations after which the substrates may be fired to fuse the same and hermetically seal or bond the same to each other. The metallized portions may also be plated with other metals such as silver, gold, tin, copper or solder to facilitate subsequent diaphragm attachment. The diaphragm may be attached by soldering, welding, brazing or thermo compression or adhesive technique to the electrode 28. Termination tabs for leads 34 and 46 may be similarly provided.

The foregoing is a description of an improved capacitative pressure transducer whose inventive concepts are believed set forth in the accompanying claims.

What is claimed is:

1. A variable capacitance pressure responsive transducer comprising:
   a substrate assembly of electrically insulating material having first and second spaced apart surfaces having substantially coextensive peripheral boundaries and a fixed capacitor plate within the boundary of said first surface to form a first electrode;
   a metal diaphragm hermetically secured to the first surface of said substrate assembly in surrounding relation to said fixed capacitor plate and spaced from said first surface boundary to form a second electrode and a chamber containing said fixed capacitor plate;
   and a fluid passageway in said substrate in communication with said chamber and longitudinally extending substantially parallel to said first and second surfaces to a point external to said chamber to provide fluid communication between said chamber and said point.

2. In the transducer claimed in claim 1, a metallic deposit on said assembly adjacent said external point to permit metallic sealing of said passageway.

3. The transducer claimed in claim 1 in which said substrate assembly includes a first substrate of nonconductive material with said fixed capacitor plate and diaphragm secured to one surface of said first substrate; and a second substrate of non-conductive material hermetically secured to another surface of said first substrate and spaced from said first surface.

4. The transducer claimed in claim 3 in which said first substrate and said second substrate each have an aligned opening communicating with said chamber through said fixed capacitor plate;
   and said fluid passageway includes a slot in said second substrate extending radially from the opening in said second substrate to the boundary of said second substrate.

5. The transducer claimed in claim 4 in which said substrate assembly includes a third substrate of non-conductive material carrying a second fixed capacitor plate and a second diaphragm hermetically secured to one surface of said third substrate with another surface of said third substrate hermetically secured to a surface of said second substrate spaced from said first substrate and all of said substrates are formed of a ceramic material.

6. In the transducer claimed in claim 5, a metal deposit on each of said substrates at said point and adjacent said fluid passageway for receiving a solder deposit.

7. The transducer claimed in claim 5 in which said third substrate and second fixed capacitor plate each have an opening aligned with the openings in the first and second substrates and said transducer includes a first conductive lead in each of said aligned openings electrically connecting said fixed capacitor plates to each other; and a lead on one surface of said second substrate connecting said fixed capacitor plates to a position external to the periphery of one of said diaphragms.

8. A variable capacitance pressure responsive transducer including a pair of electrically non-conductive substrates each having a metal diaphragm hermetically secured to the respective non-conductive substrate in overlapping spaced relationship to a respective fixed capacitor on the respective substrate with each substrate having a first passageway extending to a respective chamber formed by said diaphragms and substrates, said transducer further comprising:
an electrically non-conductive intermediate substrate between said pair of substrates hermetically sealed to each substrate of said pair and having a fluid passageway therein extending radially from a portion of said intermediate substrate located radially outward of the hermetic seal of each diaphragm to each first passageway for fluid communication with each chamber.

9. The transducer claimed in claim 8 in which each first passageway extends through a respective fixed capacitor plate; and means are formed in each first passageway and on said intermediate substrate for connecting an external lead to each fixed capacitor plate.

10. The transducer claimed in claim 8 in which each of said substrates is formed of a ceramic material and said passageway is defined by a slot in said intermediate substrate.

11. In the transducer claimed in claim 10, a metal deposit on each substrate adjacent said portion.

12. In the transducer claimed in claim 11, a second passageway extending through each substrate and through each fixed capacitor plate for placing each chamber in communication with the other chamber, and a metal deposit in said second passageway extending from each fixed plate to one surface of said intermediate substrate, and a metal deposit on said one surface of said intermediate substrate connecting the metal deposit in said second passageway to a position radially outwardly of the periphery of one of said diaphragms for connecting an external lead to said fixed plates.

13. A variable capacitance pressure responsive transducer including a chamber formed by a metal diaphragm hermetically secured to one surface of a first ceramic substrate and in overlapping spaced relationship to a fixed capacitor plate on the substrate with said substrate having a chamber passageway extending from the chamber through the substrate to another surface of the substrate, said transducer further comprising:
another ceramic substrate hermetically sealed to the other surface of said first substrate and having a passageway therein extending longitudinally and substantially parallel to said one surface from a portion of said other substrate located radially outward of the hermetic seal of said diaphragm in communication with said chamber,
and means on said other substrate for extending an electrical connection to said fixed capacitor plate.

14. A substrate assembly combined with a pair of metal diaphragms to form a variable capacitance pressure responsive device comprising:
a pair of spaced apart plate-like electrically non-conductive substrates each having a supporting surface to which a respective one of said diaphragms is hermetically secured to form a respective chamber and a second surface spaced from the supporting surface with an opening extending from the respective chamber to the respective spaced surface;
a respective fixed capacitor plate secured to each supporting surface and located within a respective chamber and spaced from a respective diaphragm;
a lead for connection to a respective diaphragm formed on each supporting surface extending radially outwardly from the periphery of a respective one of said diaphragms;
an intermediate plate-like electrically non-conductive substrate between said pair of substrates hermetically sealed to a respective spaced surface of each of said pair of substrates and having a slot therein communicating with each opening and extending to the edge of said intermediate substrate for enabling the passage of a fluid either to or from each chamber;
and means for interconnecting each fixed capacitor plate to each other fixed plate and for interconnecting each lead to each other lead.

15. The assembly claimed in claim 14 in which said means for interconnecting each fixed capacitor includes a metal deposit in each opening, and said intermediate substrate has a metal deposit on one surface of said intermediate substrate connected to the metal deposit in each opening and extending to a position located radially outwardly of the periphery of one of said diaphragms.

16. The assembly claimed in claim 14 in which a metal is deposited on each supporting surface overlapping a portion of said slot and on said intermediate substrate adjacent said slot for controlling fluid passage through said slot.

* * * * *